US005906367A

United States Patent [19]

Takagaki

[11] Patent Number: 5,906,367
[45] Date of Patent: May 25, 1999

[54] MULTIPLE SET DISCHARGE TRAY FOR A PRINTING APPARATUS

[75] Inventor: Gou Takagaki, Toyohashi, Japan

[73] Assignee: Minolta Co., Ltd., Osaka, Japan

[21] Appl. No.: 08/977,071

[22] Filed: Nov. 24, 1997

[30] Foreign Application Priority Data

Nov. 26, 1996 [JP] Japan ........ 8-314912

[51] Int. Cl.[6] ........ B65H 31/12; B65H 31/26; B65G 57/00

[52] U.S. Cl. ........ 271/218; 271/220; 271/207; 414/790.8; 414/790.3; 414/788.9

[58] Field of Search ........ 271/218, 220, 271/207; 414/790.8, 790.3, 788.9

[56] References Cited

U.S. PATENT DOCUMENTS 3,054,516 9/1962 Joa ........ 414/790.3
3,107,013 10/1963 Euwe ........ 414/790.3
3,379,320 4/1968 Loach et al. ........ 414/790.3
3,477,201 11/1969 Small ........ 414/790.3
3,591,018 7/1971 Nalbach ........ 271/218
3,641,735 2/1972 Daily et al. ........ 414/790.3
4,183,704 1/1980 Steinhart ........ 414/790.3
4,529,190 7/1985 Goodwin et al. ........ 271/218
4,905,053 2/1990 Matsuo et al. ........ 355/319

*Primary Examiner*—William E. Terrell
*Assistant Examiner*—Joe Dillon, Jr.
*Attorney, Agent, or Firm*—Sidley & Austin

[57] ABSTRACT

A multiple set discharge tray receives sets of copy sheets discharged from an adjoining printing apparatus. The discharge tray includes a selectively movable partition mechanism which is capable of extending a partition over, and retracting an extended partition from, a surface of the discharge tray which receives sets of copy sheets. An extended partition enables receipt of a subsequent set of copy sheets while a prior set is being processed and expelled from the discharge tray thereunder.

17 Claims, 4 Drawing Sheets

MULTIPLE SET DISCHARGE TRAY FOR A PRINTING APPARATUS

BACKGROUND OF THE INVENTION

1. Field of the Invention

The present invention relates to a sheet handling apparatus, and more particularly to a sheet handling apparatus which stacks sheets ejected from an image forming apparatus set by set and carries out stapling, punching, binding etc. with respect to each set of sheets.

2. Description of Related Art

Recently, in the art of copying machines and printers, various types of sheet handling apparatuses (finishers) which staple, punch and/or bind sheets with images thereon have been developed.

With respect to such sheet handling apparatuses, there has been a type which distributes sets of sheets among a plurality of sheet trays arranged on different levels and carries out necessary processes with respect to the sets of sheets. However, providing a plurality of sheet trays on different levels causes problems of increasing the size of the apparatus and of complicating the sheet transport system.

Also, there has been another type which has a single sheet tray and carries out necessary processes with respect to a set of sheets stacked on the tray. This type can be downsized. However, transportation of a next set of sheets to the tray cannot be started until the previous set has been subjected to necessary processes and taken out of the tray. Accordingly, image forming operations must be commonly delayed, thereby lowering productivity.

SUMMARY OF THE INVENTION

It is an object of the present invention to provide a sheet handling apparatus which is of a single stack tray type, that is, of a simple structure, and is improved so as not to lower the efficiency of producing copies/prints as with conventional devices.

In order to attain the object, a sheet handling apparatus according to the present invention comprises: a tray on which image-formed sheets transported thereto one by one are stacked; a side regulating plate which regulates sides of the sheets transported to the tray; a partition member which is capable of advancing to and retreating from a position which is over a surface of the tray at a specified distance; and a take-out member which takes the stacked sheets out of the tray. In the apparatus, the partition member advances to the position over the surface of the tray when a set of sheets has been stacked on the tray, so that succeeding sheets transported to the tray are received on the partition member.

When a set of image-formed sheets has been stacked on the tray, the set of sheets is taken out of the tray after being subjected to a necessary process, such as a stapling process, or to be subjected to a necessary process outside the tray. In the apparatus of the above-described structure, when a set of sheets has been stacked on the tray, the partition member advances over the set of sheets and receives succeeding image-formed sheets. In this way, a set of sheets which has been stacked on the tray is separated from succeeding sheets by the partition member.

Therefore, according to the present invention, it is no longer necessary to delay transporting of succeeding sheets to the tray stand due to a set of sheets previously stacked on the tray which is either subjected to a next process or taken out of the tray. Accordingly, it is not necessary to delay processes, such as a copying/printing process, and the productivity of the present invention is not lowered.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

A preferred embodiment of the present invention is described with reference to the accompanying drawings.

Figure 1:
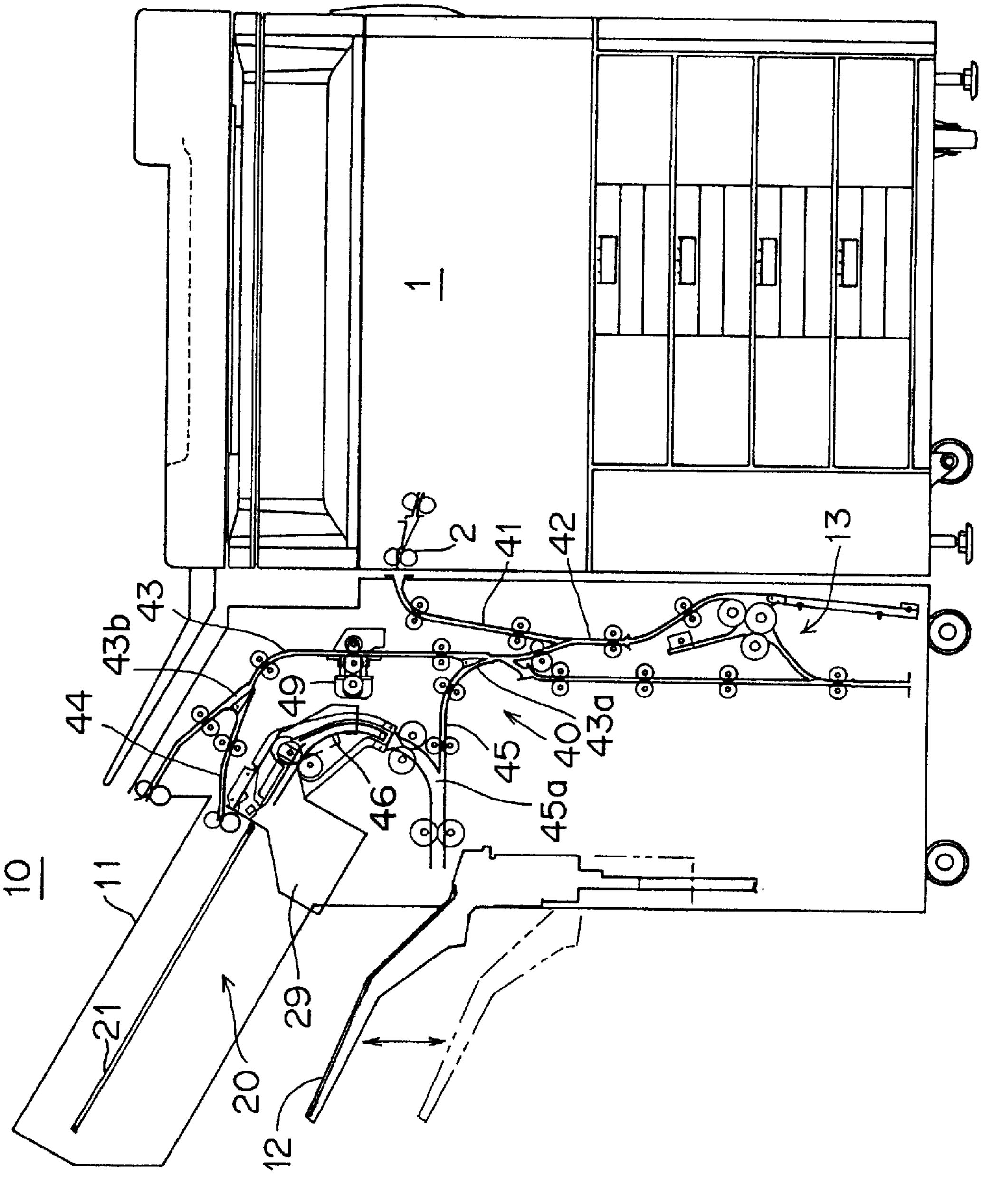
FIG. 1 is a schematic view of a copying machine and a sheet handling apparatus which is an embodiment of the present invention.

FIG. 1 shows a copying machine 1 and a sheet handling apparatus 10 attached thereto. The sheet handling apparatus 10 stacks, staples, punches, and/or folds copy sheets discharged from the copying machine 1. The copying machine 1 forms images on sheets by a well-known electrophotographic method and discharges the copy sheets through a pair of discharge rollers 2.

The sheet handling apparatus 10 comprises a non-sort tray 11 on which copy sheets discharged from the copying machine 1 are stacked; a stapling section 20 which stacks copy sheets on a tray 21, takes the stacked sheets out of the tray 21, and staples the sheets with a stapler 29; a large-capacity sheet tray 12 which is movable up and down, a folding section 13; and a sheet transporting section 40.

The sheet transporting section 40 comprises a transport path 41 which receives sheets from the copying machine 1 and transports the sheets downward; a switchback path 42 which enables the sheets to make a switchback and transports the sheets upward; a transport path 43 which transports the sheets which have made a switchback to the non-sort tray 11; a transport path 44 which diverges from the transport path 43 at a point 43*b* to transport the sheets to the stapling section 20; a transport path 45 which diverges from the transport path 43 at a point 43*a* to transport the sheets to the large-capacity sheet tray 12; and a transport path 46 which transports stapled sheets from the stapling section 20 to a junction 45a with the transport path 45. In the transport path 43, a punching mechanism 49 is provided.

Since the structures and operations of the large-capacity sheet tray 12, the folding section 13, and the punching mechanism 49 are well-known, the descriptions thereof are omitted.

Figure 2:
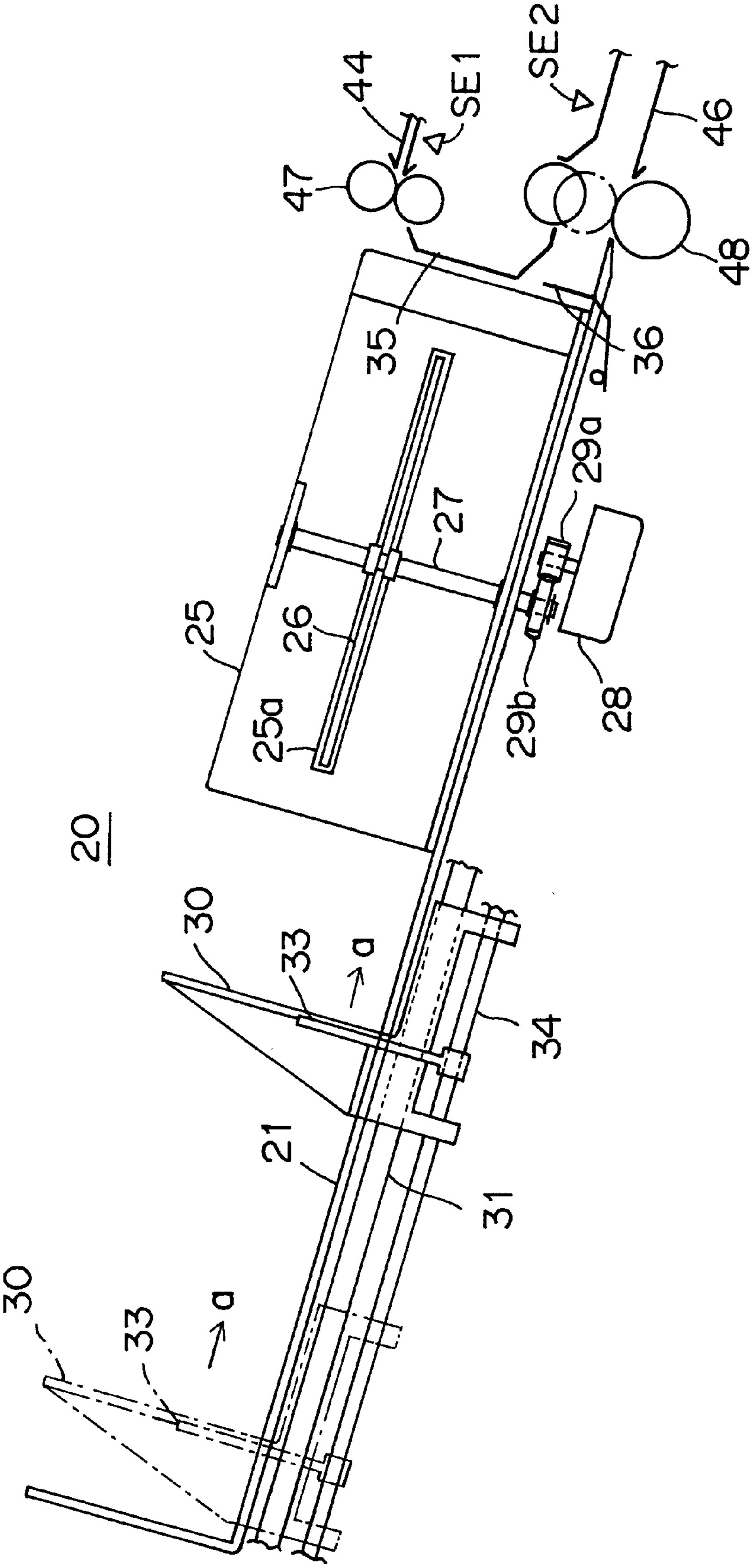
FIG. 2 is a side view of a stapling section of the sheet handling apparatus.
Figure 3:
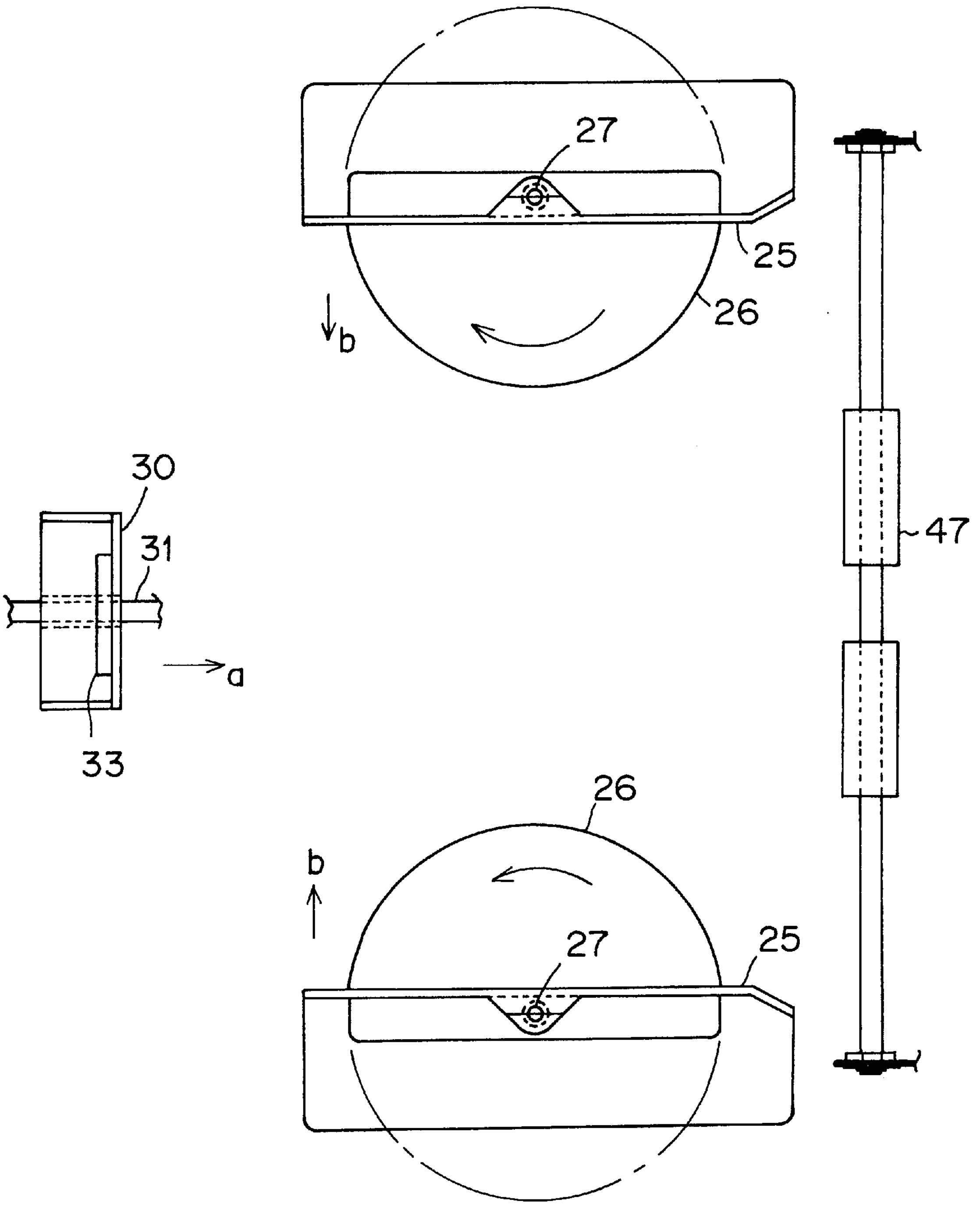
FIG. 3 is a plan view of the stapling section.

FIGS. 2 and 3 show the stapling section 20. The tray 21 has side regulating plates 25, a take-in leading edge regulating plate 30, and a take-out (discharge) leading edge regulating plates 35 and 36. Each of the side regulating plates 25 has a partition plate 26. At the end of the transport path 44, a pair of transport rollers 47 and a sheet sensor SE1 are provided, and a copy sheet is transported onto the tray 21 through the transport rollers 47.

The side regulating plates 25 are to regulate the sides of sheets transported to the tray 21. The regulating plates 25 are movable in the direction of arrow “b” shown in FIG. 3 and are set to positions suitable for the size of the copy sheets. If the copying machine 1 and the sheet handling apparatus 10 are of a type which transport copy sheets with one side of the copy sheets set with respect to a reference position at all times, the side regulating plate 25 which is to regulate the side of the copy sheets set with respect to the reference position is fixed, and only the other side regulating plate 25 is moved to a position suitable for the size of the copy sheets.

Figure 4:
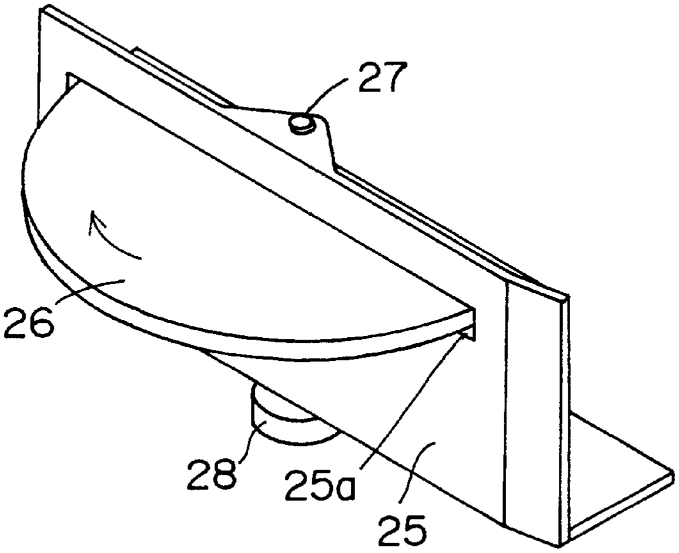
FIG. 4 is a perspective view of a side regulating plate and a partition plate of the sheet handling apparatus.

As shown in FIGS. 3 and 4, the partition plates 26 are substantially semicircular and are fitted in slits 25*a* of the respective side regulating plates 25 in such a manner to be capable of rotating on respective shafts 27 in a plane which is parallel to the surface of the tray 21. The lower end of the shafts 27 are connected to a motor 28 via gears 29*a* and 29*b* (see FIG. 2). When the motor 28 is driven, the partition plates 26 advance over the tray 21 at a specified distance from the surface of the tray 21 or retreat from the tray 21 and to move behind the respective side regulating plates 25.

Figure 5:
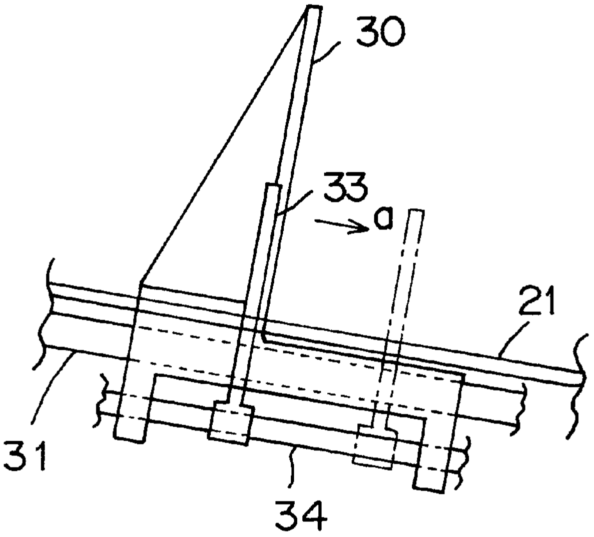
FIG. 5 is an illustration of a pushing plate, showing its take-out motion.

The take-in leading edge regulating plate 30 is capable of sliding on a guide shaft 31. As shown in FIG. 2, the regulating plate 30 is moved from a home position shown by the alternate short and long dash line in the direction of arrow "a" to be set in a position suitable for the size of the copy sheets. In the regulating plate 30, a pushing plate 33 which is capable of sliding on a guide shaft 34 is incorporated. The pushing plate 33 is independently movable in the direction of arrow "a" (see FIG. 5) so as to push the stacked copy sheets out of the tray 21.

The take-out leading edge regulating plate 35 is fixed in an upper position of the entrance of the tray 21. The other take-out leading edge regulating plate 36 is provided in the entrance of the tray 21 and is capable of extending upward from the surface of the tray 21 and retreating downward from the surface. This regulating plate 36 retreats from the surface of the tray 21 in synchronization with the take-out motion of the pushing plate 33.

A pair of transport rollers 48 and a sensor SE2 for detecting a sheet are provided at the end of the tray 21 (that is, at an entrance of the transport path 46). A lower roller of the transport rollers 48 is rotatably provided at a fixed position and an upper roller is detachable provided from the lower roller. The upper roller is a following roller which is rotated by rotation of the lower roller.

Next, partition of copy sheets into sets on the tray 21 is described.

When a copying operation of the copying machine 1 is started, the partition plates 26 are in a retracted position behind the respective side regulating plates 25. The side regulating plate 25 and the take-in leading edge regulating plate 30 are set in positions suitable for the size of copy sheets to be transported to the tray 21. Then, the copy sheets are transported onto the tray 21 one by one through the transport rollers 47. When the last sheet of one set has been transported onto the tray 21, and more specifically when a specified time has passed after the sensor SE1 detected the trailing edge of the last sheet, the motor 28 is driven. Thereby, the partition plates 26 rotate 180 degrees to advance into the tray 21 and be positioned above the set of copy sheets in the tray 21. Copy sheets transported to the tray 21 thereafter are received on the partition plates 26 and are also regulated by the regulating plates 25, 30 and 35.

The set of copy sheets under the partition plates 26 is pushed in the direction of arrow "a" by the pushing plate 33. At this time, the take-out leading edge regulating plate 36 retreats downward from the surface of the tray 21. Then, the upper roller of the transport rollers 48 comes down, and the set of copy sheets are nipped between the transport rollers 48 and taken out of the tray 21. When the sensor SE2 has detected the trailing edge of this taken-out set of copy sheets, the pushing plate 33 and the regulating plate 36 are returned to the respective regulating positions, and the partition plates 26 rotate 180 degrees to retreat from the tray 21. Thereby, copy sheets stacked on the partition plates 26 come down on the surface of the tray 21.

The stapler 29 staples sets of sheets in a leading edge staple mode, in a trailing edge staple mode, or in a center staple mode. The time when a set of sheets has been completely taken out of the tray 21 depends on the selected staple mode. The completion of the take-out of a set of sheets from the tray 21 is detected by the sensor SE2.

As described above, in the present embodiment, copy sheets are transported to the tray 21 one by one, and when one set of copy sheets has been stacked thereon, the partition plates 26 advance over the tray 21 to part the set of copy sheets from succeeding copy sheets. With this arrangement, it is not necessary to make transportation of the next set of copy sheets to the tray 21 stand by until the foregoing set of copy sheets has been taken out of the tray 21. Therefore, the copying machine 1 can continue copying operations at a regular speed and increase copy productivity.

Regulating members of any structure can be used to regulate copy sheets on the tray 21. Also, the partition plates 26 do not have to be of the above-described rotary type and can be of a linear movable type which moves linearly between an advancing position and a retreating position. Further, for take-out of a set of copy sheets from the tray 21, a chucking mechanism as well as the pushing plate 33 can be used.

Although the present invention has been described in connection with the preferred embodiment, it is to be noted that various changes and modifications are possible to those who are skilled in the art. Such changes and modifications are to be understood as being within the scope of the present invention.

What is claimed is:

1. A sheet handling apparatus comprising:

a tray having a surface on which sheets transported thereto are received and stacked;

a side regulating plate positioned along at least one side of the surface to generally align sheets received on the surface;

a partition members;

an actuation mechanism, coupled to the partition member, to advance the partition member to and retract the partition member from a position over the surface of the tray, wherein when the partition is advanced over the surface, a space is defined between the surface of the tray and a lower surface of the partition; and a discharge member to discharge stacked sheets from the tray;

wherein, the partition member advances to the position over the surface of the tray when a set of sheets has been stacked on the tray, so that succeeding sheets transported to the tray are received on the partition member, and upon discharge of the sheets stacked on the tray, subsequent retraction of the partition causes the sheets received on the partition member to be deposited onto the surface of the tray.

2. A sheet handling apparatus as claimed in claim 1, wherein:

the side regulating plate is movable to accommodate sheets of varying dimensions which may be transported to the tray; and the partition member is operatively coupled to the side regulating plate in such a manner as to be capable of advancing to and retracting from a position over the surface of the tray.

3. A sheet handling apparatus as claimed in claim 2, wherein the partition member is semicircular and is operatively coupled to the side regulating plate in such a manner as to be capable of rotation relative to the side regulating plate.

4. A sheet handling apparatus as claimed in claim 3, wherein the actuation mechanism is a motor.

5. A sheet handling apparatus as claimed in claim 1, further comprising:

a take-in leading edge regulating plate which regulates take-in leading edges of sheets, wherein the take-in leading edge of each sheet is a leading edge of the sheet when it is transported to the tray; and a discharge leading edge regulating plate which regulates discharge leading edges of sheets within the tray, wherein the discharge leading edge of each sheet is a leading edge of the sheet when it is discharged from the tray.

6. A sheet handling apparatus as claimed in claim 5, wherein the discharge leading edge regulating plate includes a movable member and a fixed member.

7. A sheet handling apparatus as claimed in claim 6, wherein the discharge leading edges of sheets which are received on the partition member are regulated by the fixed member of the discharge leading edge regulating plate.

8. A sheet handling apparatus as claimed in claim 5, wherein the take-in leading edge regulating plate is movable to accommodate and regulate sheets of varying dimensions which may be transported to the tray.

9. A sheet handling apparatus as claimed in claim 8, wherein the take-in leading edge regulating plate includes the discharge member.

10. A sheet handling apparatus as claimed in claim 9, wherein the discharge member is adapted to push the sheets stacked on the tray in a first direction relative to the tray to discharge the sheets from the tray.

11. A sheet handling apparatus as claimed in claim 10, wherein the movable member of the discharge leading regulating plate retreats from a transport path in synchronization with a discharge motion of the discharge member.

12. A sheet handling apparatus comprising:

a tray having a surface on which sheets transported thereto are received and stacked;

a partition member;

a controller which outputs a signal responsive to at least a last sheet of a set of sheets, wherein the set of sheets includes at least one sheet;

an actuation mechanism, coupled between and to the controller and the partition member, to automatically advance the partition member to and retract the partition member from a position over the surface of the tray in response to the signal, wherein when the partition is advanced over the surface, a space is defined between the surface of the tray and a lower surface of the partition, in response to the signal of the controller; and a discharge member to discharge stacked sheets from the tray;

wherein, the partition member advances to the position over the surface of the tray when a set of sheets has been stacked on the tray, so that succeeding sheets transported to the tray are received on the partition member.

13. A sheet handling apparatus as claimed in claim 12, further comprising a side regulating plate positioned along at least one side of the surface to generally align sheets received on the surface, wherein the partition member is operatively coupled to the side regulating plate in such a manner as to be capable of advancing to and retracting from a position over the surface of the tray.

14. A sheet handling apparatus as claimed in claim 13, wherein the partition member is semicircular and is operatively coupled to the side regulating plate in such a manner as to be capable of rotation relative to the side regulating plate.

15. A sheet handling apparatus as claimed in claim 12, the tray further comprises a take-in leading edge regulating plate which regulates take-in leading edges of sheets, wherein the take-in leading edge of each sheet is a sheet edge closer to a second end of the tray than a first end of the tray when the sheet is in the tray.

16. A sheet handling apparatus as claimed in claim 15, wherein the take-in leading edge regulating plate includes the discharge member.

17. A sheet handling apparatus as claimed in claim 16, wherein the controller is coupled to and controls the operation of the discharge member.

* * * * *